(12) United States Patent
Veroni

(10) Patent No.: US 8,451,005 B2
(45) Date of Patent: May 28, 2013

(54) DEVICE AND METHOD FOR DETECTING A STREET LAMP FAULT

(75) Inventor: Fabio Veroni, Vimercate-Milano (IT)

(73) Assignee: Enel Distribuzione S.p.A., Rome (IT)

( * ) Notice: Subject to any disclaimer, the term of this patent is extended or adjusted under 35 U.S.C. 154(b) by 456 days.

(21) Appl. No.: 12/667,169

(22) PCT Filed: Jun. 29, 2007

(86) PCT No.: PCT/EP2007/056587
§ 371 (c)(1), (2), (4) Date: Jun. 7, 2010

(87) PCT Pub. No.: WO2009/003512
PCT Pub. Date: Jan. 8, 2009

(65) Prior Publication Data
US 2010/0244844 A1 Sep. 30, 2010

(51) Int. Cl.
*G01R 31/00* (2006.01)
*G01R 19/00* (2006.01)

(52) U.S. Cl.
USPC .............. 324/414; 324/403; 324/500; 702/64

(58) Field of Classification Search
USPC ............ 324/105, 403–414, 500–555, 764.01; 702/340, 361, 60, 57, 58, 59, 64
See application file for complete search history.

(56) References Cited

FOREIGN PATENT DOCUMENTS

| FR | 2693276 A1 * | 1/1994 |
|---|---|---|
| FR | 2 725 277 | 4/1996 |
| FR | 2725277 A1 * | 4/1996 |
| FR | 2688067 B1 * | 4/1998 |
| FR | 2 893 197 | 5/2007 |
| JP | A 2002-170691 | 6/2002 |
| JP | A 2003-045681 | 2/2003 |

OTHER PUBLICATIONS

FR_2688067_Machine Translation, May 23, 2012.*
FR_2725277_Machine Translation, May 23, 2012.*
FR_2693276_Machine Translation, May 23, 2012.*
Antoine, Chastel, Detecting Defects in Public Lighting Network, Apr. 1996, pp. 1-12.*
International Search Report for PCT/EP2007/056587, mailed Apr. 21, 2008.
International Preliminary Report on Patentability with Amended Sheets for PCT/EP2007/056587, mailed Oct. 28, 2009.
English translation of Chinese official action, mailed Jun. 14, 2012 in Chinese application No. 200780053584.7.
English summary of Japanese official action, mailed Jun. 25, 2012 in Japanese application No. 2010-513669.

* cited by examiner

*Primary Examiner* — Melissa Koval
*Assistant Examiner* — Farhana Hoque
(74) *Attorney, Agent, or Firm* — Nixon & Vanderhye, P.C.

(57) ABSTRACT

A device for detecting a fault of at least one street lamp of a plurality of street lamps which are connectable in common to an AC power supply is proposed. The proposed device allows detecting whether a fault has occurred based on obtaining measures representative of the total active and reactive power supplied by the AC power supply to the plurality of street lamps, and detecting variations in these measures. Optionally, also the type of fault can be determined based on detected variations in the power measures.

32 Claims, 9 Drawing Sheets

| detected voltage | group | Table for storing past active and reactive power measure values | | | | | group average vector (Pavg; Qavg) | group reference vector (Pref; Qref) |
|---|---|---|---|---|---|---|---|---|
| | | col. 1 | col. 2 | col. 3 | ... | col. N | | |
| ... | a | ... | ... | ... | ... | ... | Pavga; Qavga | Prefa; Qrefa |
| 218-220 | b | ... | ... | ... | ... | ... | Pavgb; Qavgb | Prefb; Qrefb |
| 220-222 | c | ... | ... | ... | ... | ... | Pavgc; Qavgc | Prefc; Qrefc |
| 222-224 | d | $P_{k+1}; Q_{k+1}$ | ... | ... | ... | ... | Pavgd; Qavgd | Prefd; Qrefd |
| 224-226 | e | $P_k; Q_k$ | $P_{k+2}; Q_{k+2}$ | ... | ... | ... | Pavge; Qavge | Prefe; Qrefe |
| 226-228 | f | $P_{k+3}; Q_{k+3}$ | ... | ... | ... | ... | Pavgf; Qavgf | Preff; Qreff |
| 228-230 | g | ... | ... | ... | ... | ... | Pavgg; Qavgg | Prefg; Qrefg |
| ... | h | ... | ... | ... | ... | ... | Pavgh; Qavgh | Prefh; Qrefh |

Fig. 7

DEVICE AND METHOD FOR DETECTING A STREET LAMP FAULT

This application is the U.S. national phase of International Application No. PCT/EP2007/056587 filed 29 Jun. 2007, which designated the U.S., the entire contents of which is incorporated herein by reference.

The claims relate to a device for detecting a fault of at least one street lamp of a plurality of street lamps which are connectable in common to an AC power supply. The claims also relate to a method for detecting a fault of such street lamp, and to a computer program product adapted to cause a processor or a microcontroller to carry out the method for detecting a fault of such street lamp.

Generally, one lamp or multiple lamps can be placed at locations remote from the operator who is interested in correct operation of this lamp or these lamps. A plurality of street lamps can e.g. be placed at certain intervals along a path or street as a chain of lamps. For safety reasons, a failure of one or more of the lamps of a chain should be detected in rather short time. Conventionally, failure detection is performed in regular intervals, such as once per month, by human beings who have to inspect each lamp personally while the lamps are supplied with electrical power. This inspection is extremely costly, and it can even happen, that a lamp fails only shortly after the performed inspection, or fails only temporarily during specific operation conditions. Moreover, even in case of failure detection, a repair man will only get to know the reason for the failure by individually examining the components of the failed lamp.

Several approaches have been developed to overcome these disadvantages.

One approach for lamp fault detection known from EP 0 746 183 A1 is based on determining for each individual lamp during operation of the lamp, the phase angle between voltage and current supplied to the lamp. If the determined phase angle is within a prescribed tolerance range, the lamp is considered as non-faulty. Otherwise, a fault of this lamp is detected. Each lamp has its own fault detection module. This kind of fault detection is expensive accordingly.

For determining the phase angle, in turn, several approaches are known, as e.g. mentioned in EP 0 746 183 A1.

According to EP 0 746 183 A1, one approach for determining the phase angle is to measure the time between a zero-crossing of the voltage supplied to a respective lamp and a zero-crossing of the current for the same period. This approach is based on the assumption that the applied voltage and current correspond to ideal sine curves shifted in time with respect to each other. However, in reality voltage and current supplied to the lamp are distorted for example due to presence of harmonics of higher order and effects of non-linear components. Thus, this approach results in a rather imprecise and unreliable detection of the state of a lamp.

Another approach, according to EP 0 746 183 A1, for determining the phase angle is as follows. On the basis of instant measurements of voltage and current waves, taking into account disturbances to due higher order harmonics and non-linear effects, the active power, P, absorbed by the lamp and the related apparent power, S, are determined. A microprocessor performs calculations based on the relationship between the active power P and the apparent power S and derives a phase angle for the angle between voltage and current for the period under consideration. Then, the state of the lamp is detected based on the derived phase angle. However, the amount of change of the phase angle may be very small for some specific types of faults. Thus, calculation of active power P and apparent power S requires high precision operations.

From WO 95/04446 it is known to evaluate a voltage and a current supplied in common to a plurality of lamps for fault detection. According to this approach, it is possible to determine whether at least one of the plurality of lamps has become faulty. However, when fault detection is performed not only for a single lamp but for a plurality of lamps connected in common to an AC power supply, the variation of the phase angle caused by one faulty lamp is weakened, compared to the single lamp case, by the remaining non-faulty lamps of the plurality of lamps due to an averaging effect. Thus, in case of a plurality of lamps supplied in common from a power supply, even higher precision is required for determining the phase angle between voltage and current at the point where the lamps are connected in common to the power supply.

SUMMARY

The technology described aims at providing a device and method for reliably detecting a fault of at least one street lamp among a number of street lamps which are connected in common to an AC power supply.

A device for detecting a fault of at least one street lamp of a plurality of street lamps which are connectable in common to an AC power supply, comprises a section for obtaining a value of an active power measure, P, representative of the total active power, Pt, supplied by the AC power supply to the plurality of street lamps; a section for obtaining a value of a reactive power measure, Q, representative of the total reactive power, Qt, supplied by the AC power supply to the plurality of street lamps; a section for detecting a variation, ΔP, in the obtained active power measure value; a section for detecting a variation, ΔQ, in the obtained reactive power measure value; and a fault determining section for determining whether a fault of at least one street lamp has occurred, based on the detected variations in the obtained active power measure value and in the obtained reactive power measure value.

In the most general sense, the terms active power measure and reactive power measure refer to power measures that are mutually orthogonal. Due to the orthogonal or at least quasi-orthogonal characteristics of active power measure and reactive power measure any variation of the active power measure can be detected less dependent from a variation of the reactive power measure and vice versa. Thus, the evaluation of active and reactive power measures allow a higher precision in the detection of any change of the relationship of voltage and current. This allows detecting a fault of a single lamp of a plurality of lamps connected in common to an AC power supply with higher reliability. Moreover, a fault detection for a larger number of lamps connected in common to an AC power supply is possible. Moreover, certain embodiments determine the kind of fault which has occurred in a lamp.

One among a large number of suitable active power measures P would be an average over a period, T in the following, of the power supply voltage or an integral number of periods nT, of the product of the instantaneous supply voltage, u(t) in the following, and the supply current, i(t) in the following, of the plurality of lamps. Another suitable active power measure P would be an average over the products of samples of u(t) and i(t) taken during one or an integral number of periods T. These and other suitable active power measures are for example based on the integral over one or more periods T of the product of u(t) and i(t) or based on a time discrete and quantized equivalent thereof.

One among a large number of suitable reactive power measures Q would be an average over the period T or an integer multiple thereof, of the product of a time shifted instantaneous supply voltage u(t−T/4) and the instantaneous supply current i(t). Other time shift amounts ±T(1+2m)/4, m integer, for u(t) would also be suitable. Another suitable reactive power measure Q would be an average over one or an integral number of periods T of the products of time shifted samples of the voltage u(t) and samples of i(t), the time shift corresponding to T(1+2m)/4 for any integer m including zero, e.g. m=1. These and other suitable reactive power measures are for example based on the integral or a time discrete and quantized equivalent thereof, over one or more periods T of the product of u(t) and i(t), with u(t) and i(t) having been shifted relative to each other by T(1+2m)/4, m being an integer including zero.

For the evaluation of these measures, analogue circuits as well as digital circuits like sample & hold circuits, A/D conversion circuits, multiply and add circuits, dedicated, programmable or embedded, are readily available on the market. For obtaining active and reactive power measure values, integrated circuit solutions for electric energy metering applications may also be adopted which are readily available on the market.

It is important to note that the definition of the reactive power measure as used within this description is not restricted to the above cited examples. The advantages may be obtained when using active and reactive power measures which are substantially geometrically orthogonal to each other.

Preferably, the fault determining section is adapted to determine the type of fault of at least one lamp of the plurality of lamps by means of detecting variations in the obtained active and reactive power measure values by more than respective given amounts over given observation periods. For example, if the obtained active power measure value has been detected to have decreased by more than a given amount over a given observation period, and the obtained reactive power measure has been detected to have increased by more than a given amount over a given observation period, this can be an indication that at least one lamp of the plurality of lamps is subjected to a short circuit. The fault determining section may be adapted to determine a lamp open fault if the obtained active power measure has been detected to have decreased and the obtained reactive power measure has been detected to have decreased. The fault determining section may also be adapted to determine a lamp fault due to a disconnected capacitor if the obtained reactive power measure has been detected to have increased and the obtained active power measure has been detected to have no variation beyond a given amount.

The fault determining section may also be adapted to determine a lamp cycling fault if the obtained active power measure has been detected to alternate between a decrease and an increase and the obtained reactive power measure has been detected to alternate between an increase and a decrease. This is an indication that at least one lamp of the plurality of lamps is cycling, i.e. the lamp shows a repetitive behaviour of emitting light and not emitting light when supplied with electrical power.

Preferably, the section for obtaining an active power measure value comprises a generating section for generating active energy pulses each representative of a specific active energy amount supplied to the plurality of street lamps. The frequency of the pulses or the time interval between consecutive pulses is a suitable measure of the active power. The section for obtaining an active power measure value may comprise a section for determining a frequency, $n/\Delta T1$, as the active power measure, where n is the number of active energy pulses counted in a time interval, $\Delta T1$. This embodiment allows precise and simple measurement in case of rather high power consumption. Alternatively, the section for obtaining an active power measure may comprise a section for determining a time interval, $\Delta T2$, between successive generated active energy pulses as the active power measure. This embodiment allows precise and simple measurement in case of rather low power consumption. A linear combination of these measures may be even more preferable in order to obtain a fast active power measure which is at the same time immune to noise. The same applies, mutatis mutandis, for the section for obtaining a reactive power measure value. Preferably, the generating section for generating active energy pulses and/or the generating section for generating reactive energy pulses are implemented by means of an energy metering integrated circuit.

Thus, power measures can be easily and precisely generated by exploiting off the shelf architectures and algorithms that have been developed in the field of energy metering.

Preferably, the fault detection device also comprises a voltage detecting section for detecting a measure, Vm, representative of the supply voltage of the AC power supply; and a power measure adjusting section for adjusting the obtained active power measure value and/or the obtained reactive power measure value based on the detected measure representative of the supply voltage of the AC power supply. This allows to eliminate or reduce effects of fluctuations of the AC power supply and achieves an even better resolution in the detection of a fault in one among a large number of lamps. Preferably, the power measure adjusting section normalizes the active power measure and/or the reactive power measure based on a predefined normalizing function. The predefined normalizing function may be capable of taking into account non-linear behaviour of the plurality of street lamps. Furthermore, the power measure adjusting section may normalize the active power measure and/or the reactive power measure by the square of the ratio of the detected measure representative of the supply voltage of the AC power supply and a rated supply voltage, Vr.

Preferably, the section for detecting a variation in the obtained active power measure and/or said section for detecting a variation in the obtained reactive power measure comprises a comparing section for detecting said variation of the active/reactive power measure based on a deviation of said obtained value of said active/reactive power measure from an active/reactive power measure reference value.

Preferably, the section for detecting a variation in the obtained active/reactive power measure comprises a compensation section for obtaining an average over a plurality of values obtained in the past of said active/reactive power measure, and for adjusting the active/reactive power measure reference value based on the obtained average. The compensation section may group past active/reactive power measure values into at least two groups depending on the AC power supply voltage applying at the time the respective power measure value was obtained; obtain a respective group average of past active/reactive power measure values for each of the groups; obtain a respective group reference value of a plurality of active/reactive power measure reference values, depending on the AC power supply voltage applying at the time the respective power measure value was obtained; and adjust the obtained group reference value based on the group average of past active/reactive power measure values which is associated with the AC supply voltage applying at the time the active/reactive power measure value is obtained. The comparing section may detect said variation of the active/reactive power measure based on a deviation of an obtained active/reactive power measure value from that group reference which is associated with the AC supply voltage applying at the time the active/reactive power measure value is obtained.

The compensation section may also normalize each of said plurality of past successive active/reactive power measure values by a value corresponding to the ratio of the detected AC power supply voltage and a rated supply voltage, Vr, and obtain said average based on the normalized past active/reactive power measure value.

The comparing section may preferably detect said variation of the active/reactive power measure by comparing the deviation against suitable thresholds, for example against a first threshold, Pthr−; Qthr−, and against a second threshold, Pthr+; Qthr+, larger than the first threshold; and detect negative variation if said deviation is below said first threshold, positive variation if said deviation is larger than the second threshold and no variation if the deviation is larger than the first and smaller than the second threshold.

Preferably, the section for detecting a variation in the obtained active/reactive power measure may adjust any one of the thresholds by either evaluating the value distribution of the active/reactive power measure values used for obtaining the average over a plurality of values obtained in the past of said active/reactive power measure with respect to the active/reactive power measure reference value; or by evaluating the value distribution of the group of past active/reactive power measure values, which is associated with the AC supply voltage applying at the time the active/reactive power measure value is obtained, with respect to that group reference which is associated with the AC supply voltage applying at the time the active/reactive power measure value is obtained.

The average may be a running average obtained for example by means of a window moving on the time axis for selecting the values to be included in the averaging process.

The compensation section may further preferably adjust the active/reactive power measure reference value based on the obtained average and on the previous active/reactive power measure reference value.

Preferably, the section for detecting a variation in the obtained active/reactive power measure may further comprise a section for inhibiting non-regular power measures, which is adapted such that any past active/reactive power measure for which the fault determining section determined that a fault occurred, is not represented in the obtained average.

The average, the reference, or the first threshold and/or second threshold is preferably adjusted by multiplication with a measure corresponding to the ratio of the detected AC power supply voltage and a rated supply voltage.

The averaging section preferably maintains past values of obtained active/reactive power measure values during periods where the plurality of street lamps does not receive power from the AC power supply. Preferably, said compensation section is prevented from updating the average during a period required by the street lamps for warming up and/or during periods when the plurality of street lamps does not receive power from the AC power supply. Also, the detection of a lamp fault may be inhibited during a period required by the street lamps for warming up.

Preferably, the values of groups of past active/reactive power measure values and the values of their respective group averages are initialized, such that each respective group of past active/reactive power measure values and its respective group average obtains the value of a respective group reference value which is preferably stored in a non-volatile memory.

A method for detecting a fault of at least one street lamp of a plurality of street lamps which are connected in common to an AC power supply, comprises the steps of supplying power from the AC power supply to the plurality of street lamps; obtaining an active power measure, P, representative of the total active power, Pt, supplied by the AC power supply to the plurality of street lamps; obtaining a reactive power measure, Q, representative of the total reactive power, Qt, supplied by the AC power supply to the plurality of street lamps; detecting a variation, ΔP, in the obtained active power measure; detecting a variation, ΔQ, in the obtained reactive power measure; and determining whether a fault of at least one street lamp has occurred, based on the detected variations.

A computer program product, which when loaded into program memory of a processor or microcontroller, causes the processor or microcontroller to carry out the above mentioned method for detecting a fault of at least one street lamp of a plurality of street lamps which are connected in common to an AC power supply.

BRIEF DESCRIPTION OF THE DRAWINGS

Example embodiments, which shall not be construed to limit the scope of the claims, will now be illustrated with reference to the figures.

FIG. 7 shows an arrangement for storing obtained active and reactive power measures as a function of the measured supply voltage used for long term averaging and consideration of ageing effects.

DETAILED DESCRIPTION OF THE DRAWINGS

Figure 1A:
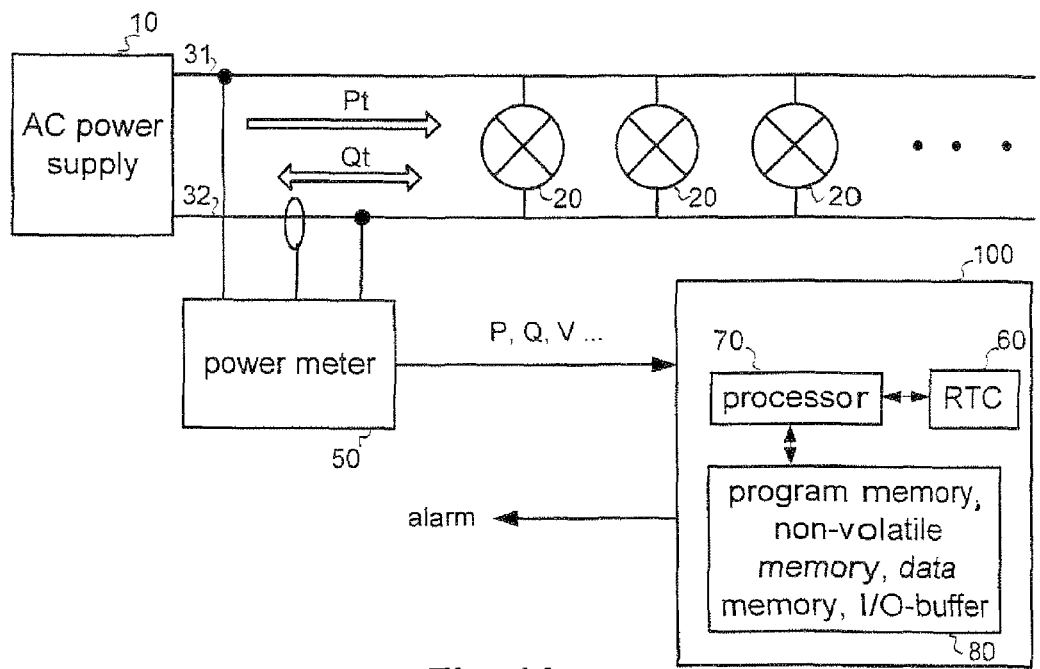
FIG. 1A shows a first embodiment of the device for detecting a fault of at least one street lamp and its arrangement within a conventional street lighting system.

FIG. 1A shows a first embodiment of the device for detecting a fault of at least one street lamp its arrangement within a conventional street lighting system.

As shown in FIG. 1A, a plurality of street lamps 20 is connected in common by means of supply lines 31, 32 to an AC power supply 10. A total active power Pt is supplied from the AC power supply 10 to the plurality of street lamps 20. The total active power Pt is the active power substantially consumed by the plurality of street lamps 20. Furthermore, a total reactive power Qt is the power which substantially oscillates between the AC power supply 10 and the plurality of street lamps 20.

A power meter 50 is connected to the supply lines 31, 32 and obtains measures, e.g. instantaneous or averaged values of voltage and current applied to the plurality of lamps 20, from the supply lines 31, 32. The power meter 50 is capable of determining, based on these measures, an active power measure P and a reactive power measure Q, and outputting P and Q to a fault detecting device 100. In this embodiment, these measures have been determined outside the fault detection device 100. Power meter 50 can also provide the fault detection device 100 with a measure V representative of the supply voltage.

The fault detecting device 100 is capable of obtaining an active power measure P and reactive power measure Q from the power meter 50. Advantageously, the fault detecting device 100 is also capable of obtaining measure V from the power meter 50.

As shown in FIG. 1A, the fault detecting device 100 comprises a processor 70, a clock 60 which is preferably a real-time clock (RTC), and memory 80, such as program memory, non-volatile memory, data memory, and an I/O-buffer. The processor 70 can access the real-time clock 60 and the memory 80, e.g. by means of a bus (not shown). The fault detecting device 100 is capable of outputting an alarm, e.g. by activating a dedicated alarm output, applying a voltage to one of its outputs, setting or resetting a register inside or outside the fault detecting device 100 etc., in case a fault of at least one street lamp of the plurality of street lamps is detected by the fault detecting device 100.

Figure 1B:
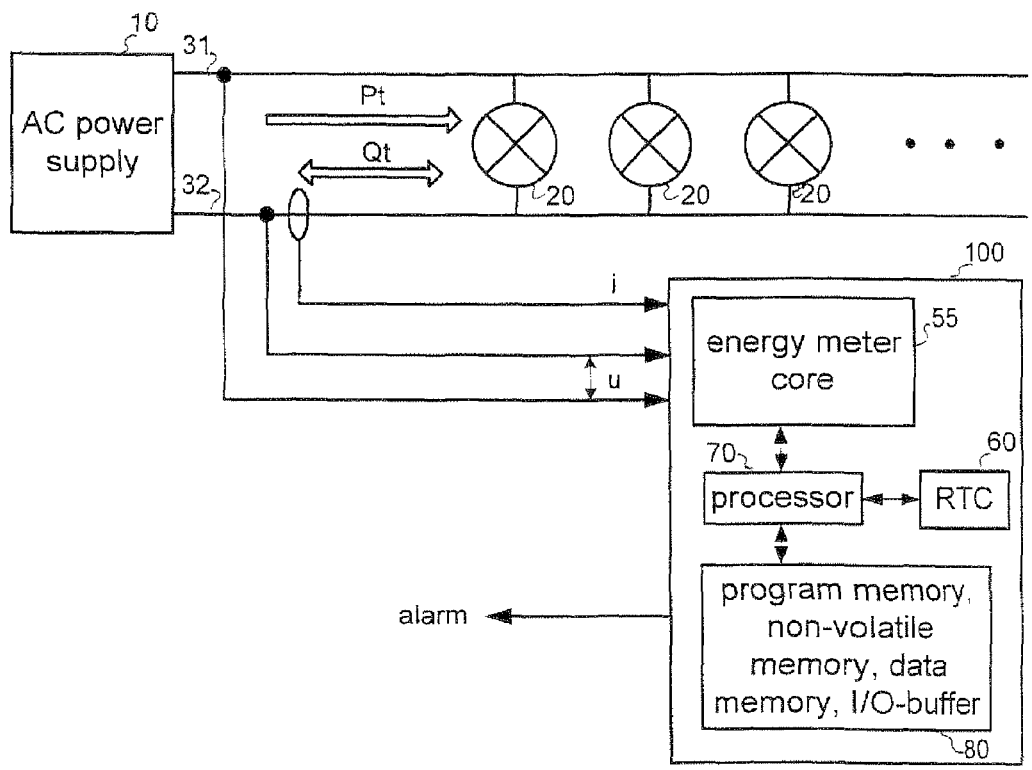
FIG. 1B shows a second embodiment of the device for detecting a fault of at least one street lamp and its arrangement within a conventional street lighting system.

FIG. 1B shows a second embodiment of the device for detecting a fault of at least one street lamp and its arrangement within a conventional street lighting system. In FIG. 1B, components and measures similar to the ones of FIG. 1A have the same reference signs as in FIG. 1A, and a detailed description of these will be omitted.

As shown in FIG. 1B, the fault detecting device 100 advantageously comprises an energy meter core 55. The energy meter core 55 is adapted to receive measures i, u which can e.g. be instantaneous or averaged measures of the voltage and current supplied to the plurality of lamps, and is capable of determining from these measures an active power measure P and a reactive power measure Q.

Figure 2:
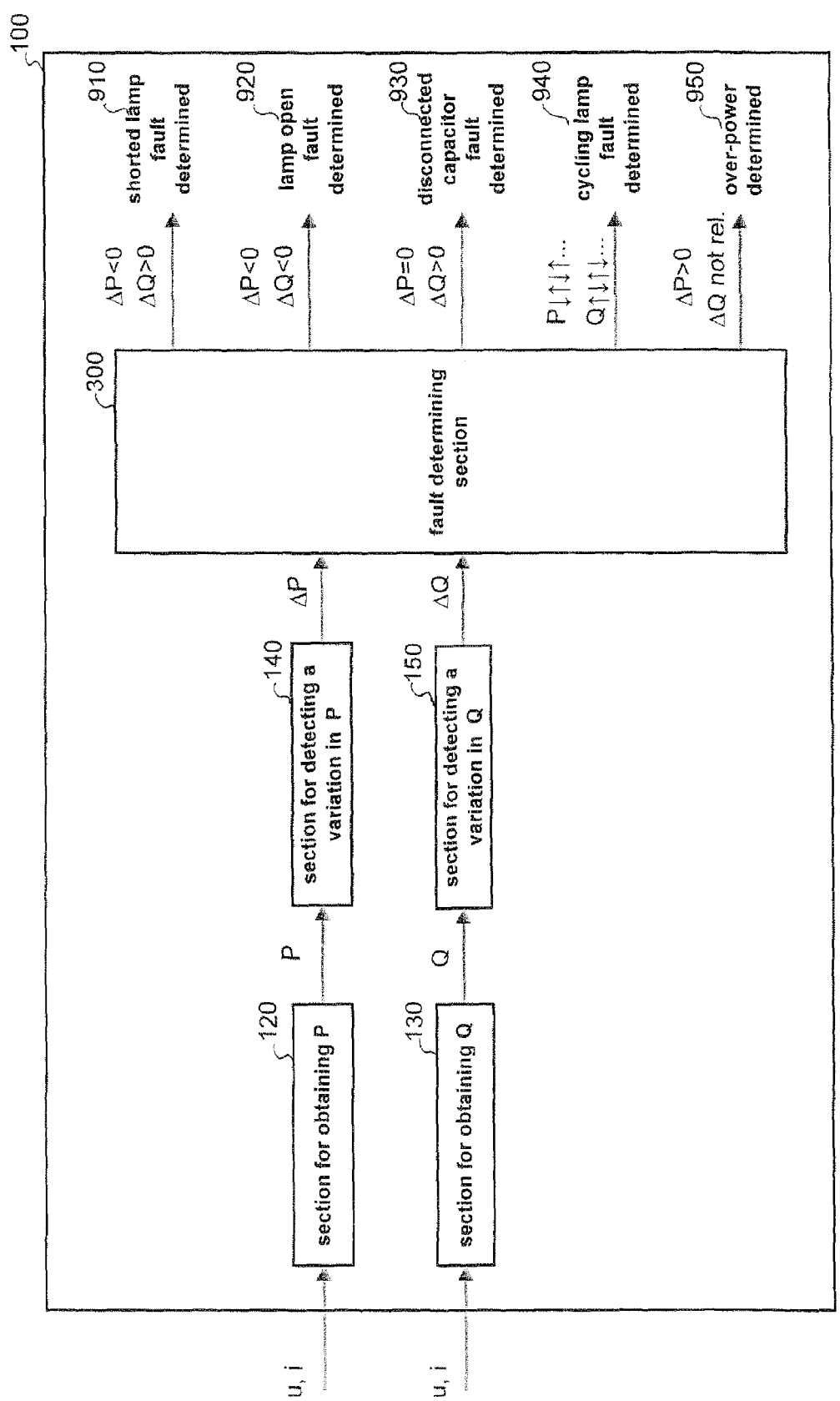
FIG. 2 shows a block diagram illustrating a third embodiment of the fault detection device.

FIG. 2 shows a block diagram illustrating a third embodiment of the fault detection device.

As shown in FIG. 2, the third embodiment of the fault detection device 100 comprises a section 120 for obtaining an active power measure, a section 130 for obtaining a reactive power measure, a section 140 for detecting a variation in the obtained active power measure, a section 150 for detecting a variation in the obtained reactive power measure, and a fault determining section 300 for determining whether a fault of at least one street lamp of the plurality of street lamps has occurred, based on the detected variations in the obtained active power measure and in the obtained reactive power measure.

The sections 120, 130 for obtaining an active/reactive power measure receive measures at their inputs, e.g. measures u and i representative of the instantaneous or averaged voltage and current, respectively, supplied to the plurality of lamps from the AC power supply 10. Based on these input measures, section 120 provides an active power measure P at its output, so that the active power measure P can be obtained from the output of section 120, and section 130 provides an reactive power measure Q at its output, so that the reactive power measure Q can be obtained from the output of section 130.

The section 140 for detecting a variation in the obtained active power measure receives the active power measure P from the section 120. Section 140 is capable of detecting a variation in the obtained active measure P by comparing the obtained active measure P to a first reference value. This first reference value can comprise a predetermined value, a previously obtained active power measure, or an average of previously obtained active power measures. The result of the comparison, $\Delta P$, is supplied to the output of section 140. Preferably, the result $\Delta P$ is determined as a difference between the active power measure P received from section 120 and the first reference value, and then supplied to the output of the section 140.

The section 150 for detecting a variation in the obtained reactive power measure receives the reactive power measure Q from the section 130. Section 150 is capable of detecting a variation in the obtained reactive measure Q by comparing the obtained reactive measure Q to a second reference value. This second reference value can comprise a predetermined value, a previously obtained reactive power measure, or an average of previously obtained reactive power measures. The result of the comparison, $\Delta Q$, is supplied to the output of section 150. Preferably, the result $\Delta Q$ is determined as a difference between the reactive power measure Q received from section 130 and the second reference value, and then supplied to the output of the section 150.

The fault determining section 300 receives measures of the detected variations $\Delta P$ and $\Delta Q$ from the sections 140 and 150, respectively. The fault determining section 300 is adapted to determine whether a fault of at least one street lamp has occurred based on the detected variations $\Delta P$ and $\Delta Q$. In case that a fault is determined to have occurred, the fault determining section 300 is adapted to perform an alarm action in order to notify that a fault has been detected. The alarm action may involve turning a dedicated alarm lamp on or off, setting or resetting one or more registers, or sending a message to a remote control unit.

Furthermore, the fault determining section 300 can also be adapted to classify the type of fault that has occurred. The type of fault can be incorporated into the alarm action.

Several types of streets lamps, i.e. devices for producing light in the environment of a street, are known: discharge lamps, such as low pressure sodium or monochromatic lamps, high pressure sodium lamps, mercury vapour lamps, metal halide lamps; induction lamps; light emitting diodes (LEDs); fluorescent lamps; and incandescent lamps. Naturally, the variety of types of faults that can be detected depends on the type of the street lamp. The following explanations are focussed on discharge lamps. This is not to be understood as limiting the scope of the claims. The general principle of detecting the type of fault by examining the variations of the active and/or reactive power measures can be applied to all types of street lamps. Discharge street lamps usually require means for limiting or controlling the current flowing through the lamp component that emits light, and for starting the lamp in order to emit light. The part of the circuit controlling current flow is also referred to as the ballast. The part of the circuit for starting the lamp is also referred to as the ignitor/igniter. As the ballast has to control the current for the lamp, the ballast is provided in series to the lamp component that emits light. A complete street lamp can be represented by an electrical equivalent circuit which has a branch having in series a ballast inductor, representing the inductance of the ballast, Lb, a resistor, representing the resistance of the ballast, Rb, and a resistor representing the resistance of the lamp component, Rh, that emits light. This branch is supplied with electrical power from the AC power supply, so that a AC voltage u(t) having the effective voltage Vm is applied to the two ends of this branch, and so that a current Ib flows in this branch. Optionally, one or more capacitors may be provided in an additional branch in parallel to the branch of Lb, Rb, and Rh, in order to provide at least a partial compensation of the reactive power consumption of the inductive components (including the street lamps and the supply lines) attached to the AC power supply. In this case, a current Ic flows through the capacitor branch. There may also be provided at least a capacitor in parallel to the plurality of street lamps, i.e. this capacitor is not included in a specific lamp but attached to the supply lines of the plurality of lamps, e.g. between supply lines 31, 32 shown in FIGS. 1A, 1B.

Any component of these two types of branches mentioned above can be subjected to a fault.

The branch of Lb, Rb, and Rh can suffer from a reduced total resistance, e.g. caused by a short circuit of this branch or by a short-circuit within the lamp component that is supposed to emit light, i.e. Rh substantially equal to zero. In the following, this type of fault is referred to as a "shorted lamp fault". In case that a specific street lamp is subjected to a shorted lamp fault, the current Ib is increased compared to regular operation. Due to the increased current Ib flowing through the inductance Ib, the total reactive power consumption Qt of the chain of street lamps is increased (the definition underlying that reactive power consumed by an inductor has positive sign, and that reactive power consumed by a capacitor has negative sign, as assumed throughout the description for the purpose of illustration and without any intended loss of generality). Moreover, in this case of a shorted lamp fault, the at least one faulty street light does not emit light. Thus, the total active power consumption Pt of the chain of lamps is decreased.

In case of detecting a negative variation of the active power measure and detecting a positive variation of the reactive power measure, the fault determining section 300 may be adapted to detect that at least one street lamp of the plurality of street lamps is subjected to a shorted lamp fault, and initiate a corresponding alarm action.

Additionally, the branch of Lb, Rb, and Rh of a specific street lamp can be electrically interrupted so that the current Ib of this specific street lamp is substantially zero. Then, the specific street lamp does not emit light although provided with electrical power, and the total consumed active power Pt is decreased, compared to non-faulty operation of the plurality of lamps. As the current flow Ib through the inductance Lb is interrupted, the total consumed reactive power Qt is decreased. In the following, this type of fault is referred to as a "lamp open fault".

In case of detecting a negative variation of the active power measure and also detecting a negative variation of the reactive power measure, the fault determining section 300 may be adapted to detect that at least one street lamp of the plurality of street lamps is subjected to a lamp open fault, and initiate a corresponding alarm action.

If a capacitor is provided in parallel to any branch of Lb, Rb, and Rh, then it may happen, that the current flow Ic through the capacitor is interrupted or decreased, e.g. because the capacitor has been damaged or it has been disconnected from the parallel branch of Lb, Rb, and Rh. In this case, all street lamps of the plurality of street lamps may still emit light, but the reactive power consumption is increased due to the degraded reactive power compensation. Thus, the total consumed active power Pt remains substantially constant, and the total consumed reactive power Qt increases due to the at least partially missing reactive power compensation provided by the faulty capacitor branch during non-faulty operation. In the following, this type of fault is referred to as "lamp fault due to a disconnected capacitor".

In case of detecting a substantially constant active power measure and detecting a positive variation of the reactive power measure, the fault determining section 300 may be adapted to detect a lamp fault due to a disconnected capacitor, and initiate a corresponding alarm action.

Additionally, at least one street lamp of the plurality of street lamps may be subjected to cycling, i.e. the lamp shows a repetitive behaviour of emitting light and not emitting light although constantly supplied with electrical power. Correspondingly, the consumed total active power Pt decreases when the lamp changes from emitting light to non-emitting light, and increases when the lamp changes from non-emitting light to emitting light. The total consumed reactive power Qt shows a corresponding behaviour. Thus, total active power Pt and total reactive power Qt decrease and increase repetitively. In the following, this type of fault is referred to as "cycling lamp fault".

In case of repetitively detecting alternating negative and positive variations of the active power measure and also repetitively detecting alternating positive and negative variations of the reactive power measure, the fault determining section 300 may be adapted to detect that at least one street lamp of the plurality of street lamps is subjected to a cycling lamp fault, and initiate a corresponding alarm action.

Moreover, an additional non-desired load may be added to the plurality of street lamps, e.g. a thief may illegally tap the supply lines for obtaining electrical power free of charge. This causes an increase of the consumed total active power Pt, irrespective any change of the consumed total reactive power Qt. In the following, this type of fault is referred to as "over-power fault".

In case of detecting an increase of the active power measure, the fault determining section 300 may be adapted to detect an over-power fault, and initiate a corresponding alarm action.

Figure 3:
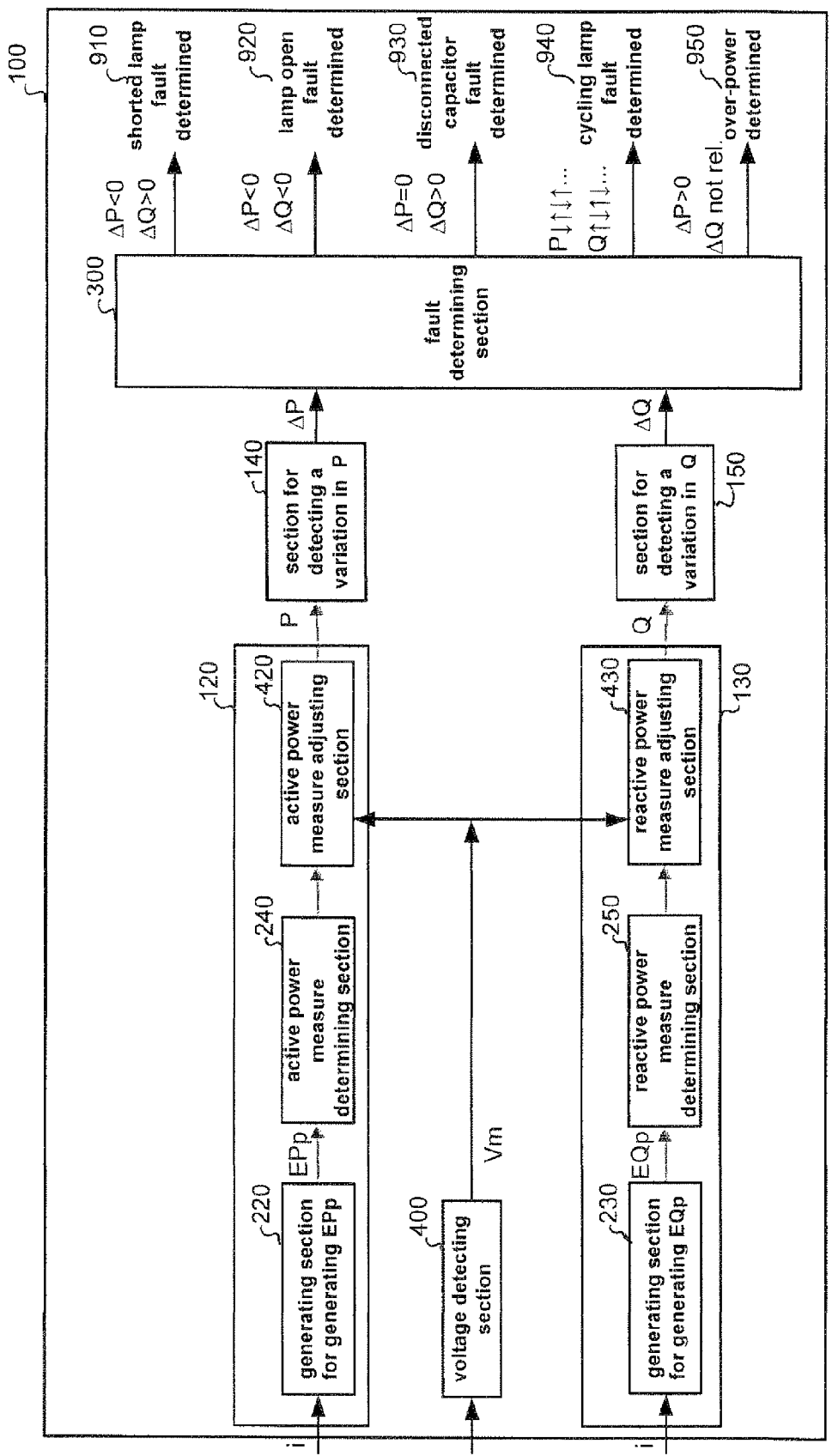
FIG. 3 shows a block diagram illustrating a fourth embodiment of the fault detection device.

FIG. 3 shows a block diagram illustrating a fourth embodiment of the fault detection device. In FIG. 3, components that are the same as the ones of FIG. 2 are denoted with the same reference numerals, and a description of these components will not be repeated in detail.

As shown in FIG. 3, the section 120 for obtaining an active power measure P may comprise a generating section 220 for generating active energy pulses, an active power measure determining section 240, and an active power measure adjusting section 420. In the generating section 220 active energy pulses, in the following EPp, may be generated, based on received measures representative of the instantaneous supply voltage u(t) and the instantaneous supply current i(t) or averaged measures thereof. Each active energy pulse is representative of a specific active energy amount supplied to the plurality of street lamps. The active power measure determining section 240 receives the generated active energy pulses from the generating section 220, and determines, based on the received active energy pulses, the active power measure P. The output of the active power measure determining section 240 provides the determined active power measure.

Correspondingly, the section 130 for obtaining a reactive power measure Q may comprise a generating section 230 for generating reactive energy pulses, a reactive power measure determining section 250, and a reactive power measure adjusting section 430. In the generating section 230 reactive energy pulses, in the following EQp, may be generated, based on received measures representative of the instantaneous time shifted supply voltage u(t−T/4) (as mentioned above, other time shift amounts T(1+2m)/4, m integer, for u(t) would also be suitable) and the instantaneous supply current i(t) or averaged measures thereof. Each reactive energy pulse is representative of a specific reactive energy amount supplied to the plurality of street lamps. The reactive power measure determining section 250 receives the generated reactive energy pulses from the generating section 230, and determines, based on the received reactive energy pulses, the reactive power measure Q. The output of the reactive power measure determining section 250 provides the determined reactive power measure.

Figure 4A:
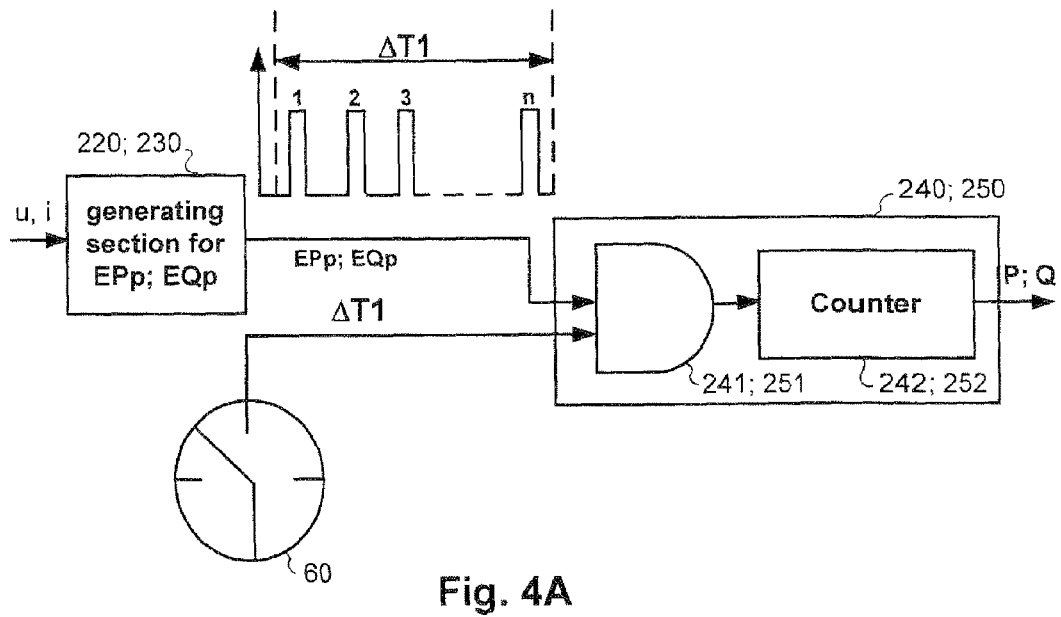
FIG. 4A shows a block diagram illustrating exemplary components of the sections for obtaining active and reactive power measures according to an embodiment in further detail.
Figure 4B:
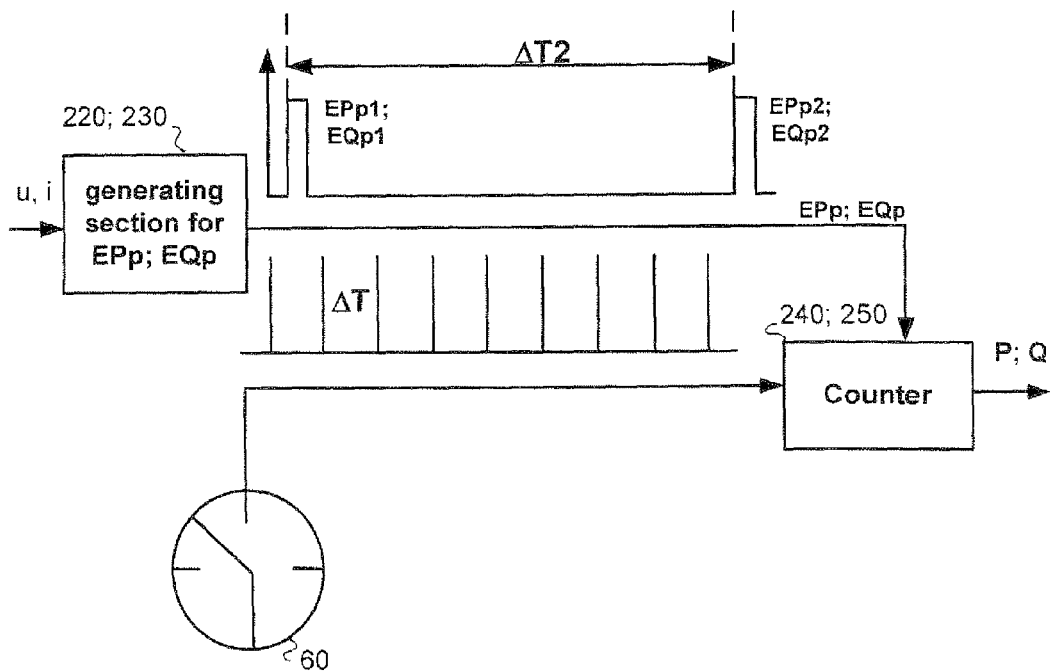
FIG. 4B shows a block diagram illustrating exemplary components of the sections for obtaining active and reactive power measures according to another embodiment in further detail.

Further details with respect to embodiments of sections 220; 230 and 240; 250 are exemplarily shown in FIG. 4A and FIG. 4B.

As shown in FIG. 4A, generating section 220; 230 generates, dependent on inputs u(t) and i(t), consecutive energy pulses EPp; EQp 1, 2, 3, . . . , n, n being a natural number, and outputs these pulses to a connected logical gate 241; 251, e.g. an AND-gate. Another input of gate 241; 251 is connected to clock 60 which outputs a signal for time interval ΔT1, such that the output of gate 241; 251 reflects the pulses of the signal input from the generating section 220; 230 during this time interval ΔT1, and the output has a constant value otherwise. The output of gate 241; 251 is fed to a counter 242; 252 which counts the number of pulses EPp; EQp present during time interval ΔT1. The counted number is provided at the output of section 240; 250 as active power measure P; reactive power measure Q. After the number of pulses present in time interval ΔT1 has been determined, the counter is reset to zero, and the above process of counting pulses during time interval ΔT1 is repeated. Thus, the counting result, provided by the counter for a specific time interval ΔT1, normalized to the amount of ΔT1, is equivalent to the frequency of the energy pulses for time interval ΔT1. Thus, the frequency of the energy pulses may be a active/reactive power measure P; Q.

With reference to FIG. 4B, another embodiment is shown for generating section 220; 230 and power measure determining section 240; 250. Similar to FIG. 4A, generating section 220; 230 generates, dependent on inputs u(t) and i(t), consecutive energy pulses EPp1; EQp1 and EPp2; EQp2. The output of generating section 220; 230 is connected to a counter 240; 250 so that the generated pulses are fed to the counter 240; 250. Additionally, the counter 240; 250 is fed by clock 60 which supplies time pulses to the counter, wherein the time pulses are substantially equally spread in time, one time pulse being followed by the next time pulse after a fixed time period ΔT. The counter 240; 250 counts the number of time pulses, i.e. the number of fixed time periods ΔT which laps from the beginning of energy pulse EPp1; EQp1 to the beginning of energy pulse EPp2; EQp2. The counting result is output as the active/reactive power measure P; Q. After outputting the counting result, the counter is reset, and the process of counting time pulses during a time interval defined by occurrence of two energy pulses is repeated.

Referring back to FIG. 3, the fault detection device may comprise a voltage detecting section 400 which is adapted for receiving at its input the instantaneous supply voltage, u(t), or samples thereof, and for outputting a measure, Vm, representative of the received input voltage level. Also, as already mentioned, the section 120; 130 can comprise a power measure adjusting section 420; 430. Preferably, section 420; 430 is adapted to receive the measure Vm supplied from the voltage detecting section 400. Then, section 420; 430 may adjust the power measure P; Q based on the measure Vm representative of the supply voltage level of the AC power supply. Preferably, section 420; 430 normalizes the power measure P; Q by the square of the ratio of measure Vm and a rated supply voltage Vr. For ease of implementation, it may be preferable to perform an approximated normalization process by adding or subtracting suitable values to/from the power measure P; Q, dependent on the detected measure Vm. This allows avoiding a complicated square and division operation, and reduces required resolution for the operands of the normalizing process. Preferably, section 420; 430 may adjust or normalize the active power measure and/or the reactive power measure based on a predefined normalizing function. The predefined normalizing function may be capable of taking into account non-linear behaviour or nonlinearity phenomena of the plurality of street lamps. It may e.g. be known that for a detected supply voltage above the rated supply voltage the active power measure and/or the reactive power measure tend to increase rapidly as a function of the detected supply voltage, whereas the active power measure and/or the reactive power measure remained unchanged for a detected supply voltage below the rated supply voltage. Then, the predefined normalizing function may be adapted for performing a small or no adjustment of the active power measure and/or the reactive power measure in the latter case, and for strongly adjusting the active power measure and/or the reactive power measure for a detected supply voltage above the rated supply voltage. This allows improved adjustment of the active power measures and/or the reactive power measures, and thus also improved fault detection.

Figure 5:
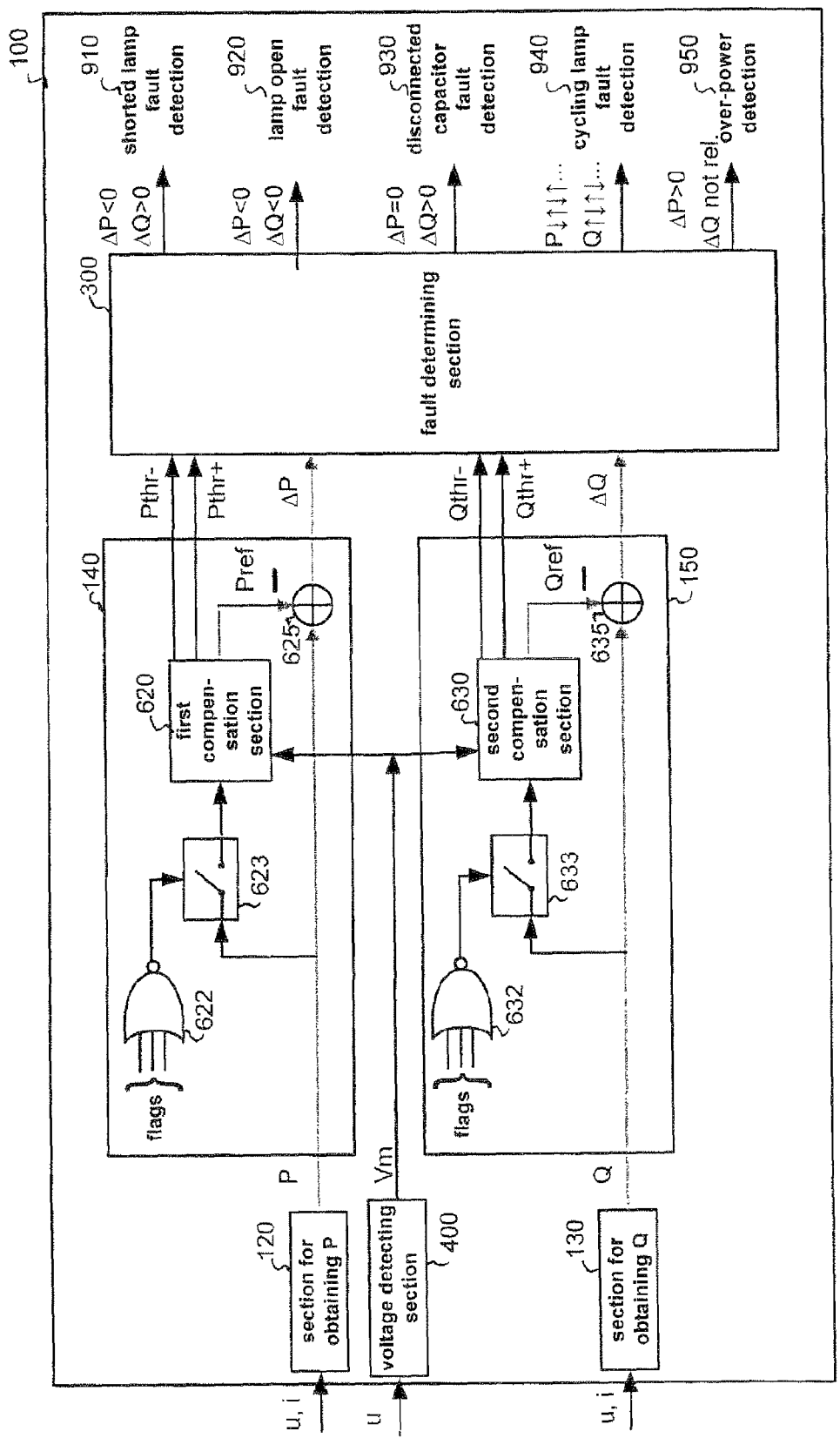
FIG. 5 shows a block diagram illustrating components of the sections for detecting a variation in active and reactive power measures according to still another embodiment.

FIG. 5 shows a block diagram illustrating components of the sections for detecting a variation in active and reactive power measures according to still another embodiment in further detail. In FIG. 5, components that are the same as the ones of FIGS. 2 and 3 are denoted with the same reference numerals, and a description of these components will not be repeated in detail.

As shown in FIG. 5, the section 140 for detecting a variation in the obtained active power measure P may comprise a first compensation section 620, a first comparison section 625, and a section for inhibiting non-regular active power measures 622, 623. As exemplarily shown in FIG. 5, the section for inhibiting non-regular active power measures 622, 623 comprises a transfer gate 623 which receives at one of its inputs obtained active power measures P, and receives at a control input a signal from an output of NOR-gate 622. NOR-Gate 622, in turn, is fed by a plurality of flags which are intended for permitting or inhibiting that an obtained active power measure passes through transfer gate 623. If at least one flag is set to a high level, the obtained active power measure is prevented from passing through transfer gate 623. Otherwise, the output of transfer gate 623 reflects the obtained active power measure. The obtained active power measure input to the section 140 is fed to the first comparison section 625, and, via the section for inhibiting non-regular active power measures 622, 623, to the first compensation section.

As shown in FIG. 5, the section 150 for detecting a variation in the obtained reactive power measure Q may comprise a second compensation section 630, a second comparison section 635, and a section for inhibiting non-regular reactive power measures 632, 653. As the structure and functions of section 150 basically correspond to the ones of section 140, except that section 150 operates on the obtained reactive power measures and not on the obtained active power measures, a detailed description of section 150 will be omitted.

The first compensation section 620 provides at one of its output an active power measure reference value, Pref, which is fed to the comparison section 625. As shown in FIG. 5, reference value Pref may be subtracted from the obtained active power measure P, in order to detect the variation, ΔP, of the obtained active power measure. Then, active power measure reference value Pref is intended to be the target value for the obtained active power measures.

Furthermore, the first compensation section 620 may have two further outputs for outputting a first and a second threshold value, Pthr− and Pthr+, wherein the first threshold is smaller than the second threshold. These thresholds may be used for enhancing the detecting of a variation in the obtained active power measure, as will be explained in more detail with reference to FIG. 6.

The first and/or the second compensation section 620, 630 may be adapted to perform operations in order to reflect ageing effects. Due to ageing, the characteristics of a street lamp will change over time, although very slowly. This distinguishes ageing effects from the sudden occurrence of a failure in a lamp. For example, the reactive power consumption of a chain of street lamps may slowly increase over time, whereas the active power consumption may slowly decrease over time. In the following, further exemplary functions and operations of the compensation sections 620, 630 for taking into account a long term variation of lamp characteristics and variations in the supply voltage level will be explained.

The first and the second compensation sections 620, 630 may be adapted to obtain an average, in the following Pavg; Qavg, over a plurality of values obtained in the past of the active power measure and the reactive power measure, respectively. Sections 620, 630 may be adapted to adjust the active power measure reference Pref and the reactive power measure reference Qref, respectively, based on the obtained average Pavg and Qavg, respectively. Thus, the reference values Pref and Qref can change in dependence on the average of the obtained power measures. In order to take into account variations in the supply voltage level, the first and the second compensation sections 620, 630 are preferably adapted to divide the plurality of past active power measures and reactive power measures into at least two groups depending on the AC power supply voltage applying at the time the respective power measure value was obtained. Then, the first and the second compensation sections 620, 630 may determine a respective group average of past active and reactive power measure values for each of the groups. A memory structure suitable for these operations of the compensation sections 620, 630 will be explained in more detail with reference to FIG. 7.

As shown in FIG. 7, a suitable memory structure for storing past obtained active and reactive power measures as groups can comprise a table of h rows and N columns. Each row a, b, . . . , h can store N past power measures P; Q. Each row/group is associated to a respective range of the detected applied supply voltage, so that the power measures stored in a respective row are associated to the respective voltage range of that group. Let us e.g. assume that power measures (Pk; Qk) . . . (Pk+3; Qk+3) have been obtained, wherein (Pk; Qk) and (Pk+2; Qk+2) have been obtained when the applied supply voltage was determined to be in the range of 224 to 226 Volt, (Pk+1; Qk+1) have been obtained when the applied supply voltage was determined to be in the range of 222 to 224 Volt, and (Pk+3; Qk+3) have been obtained when the applied supply voltage was determined to be in the range of 226 to 228 Volt. Then, as shown in FIG. 7, (Pk; Qk) and (Pk+2; Qk+2) will be stored in group e, (Pk+1; Qk+1) will be stored in group d, and (Pk+3; Qk+3) will be stored in group f.

Preferably, the compensation sections 620, 630 may normalize each of past successive active and reactive power measure values by a value corresponding to the ratio of the detected AC power supply voltage level and a rated supply voltage level, and may obtain the group averages based on the normalized past active and reactive power measure values.

Moreover, as shown in FIG. 7, the exemplified memory structure comprises a group average vector, in the following (Pavg; Qavg), of h elements (Pavga; Qavga), (Pavgb; Qavgb), . . . , (Pavgh; Qavgh). Each element of the group average vector is associated to a row/group of the table of h rows and N columns of FIG. 7, and a respective element of the group average vector stores the average of its associated row. For example, group average vector element (Pavge; Qavge) holds the average value of the last N previous active power measures obtained when the applied supply voltage was determined to be in the range of 224 to 226 Volt, which corresponds to storing these samples in group e. Naturally, it is not necessary to provide a separate group average vector, as the group average elements can also be stored in one of the N columns of the table, when only N−1 previous power samples are stored in a row.

Additionally, as shown in FIG. 7, the suitable memory structure comprises a group reference vector, in the following (Pref; Qref), of h elements (Prefa; Qrefa), (Prefb; Qrefb), . . . , (Prefh; Qrefh). Each element of the group reference vector is associated to a row/group of the table of h rows and N columns of FIG. 7, and a respective element of the group reference vector stores the power measure reference of its associated row. For example, group reference vector element (Prefe; Qrefe) holds the reference value to be used in the compensation section 620, 630 for providing an input to comparison section 625, 635 when the applied supply voltage was determined to be in the range of 224 to 226 Volt.

Preferably, the group reference vector is stored in a non-volatile memory. Preferably, for first installation of the fault detecting device 100 to a plurality of street lamps, the group reference vector is created in accordance to the characteristics of the network of the plurality of street lamps. Preferably, at run-up, each element of the table for storing past active and reactive power measure values, as exemplarily shown in FIG. 7., is initialized with the corresponding group reference vector element. For example, each of the N elements of group e of the table will be initialized with the corresponding group reference vector element (Prefe; Qrefe) at run-up. Similarly, at run-up, each element of the group average vector is initialized with the corresponding group reference vector element. For example, group average vector element e be initialized with the corresponding group reference vector element (Prefe; Qrefe) at run-up.

Preferably, obtained power measure values, that cause the fault determining section 300 to detect a fault, will be excluded from the averaging process, i.e. such power measure values will not be stored in a respective group of the suitable memory structure, exemplarily shown in FIG. 7. This can be achieved by several ways. For example, the fault detecting section 300 may, after determining based on present power measures that a fault has occurred, instruct the compensation unit not to store the respective present power measures. In case that the present power measures have already been stored by the compensation section 620, 630, the fault detecting section 300 may instruct the compensation unit to delete these stored present power measures from the memory structure.

The compensation sections 620, 630 may apply suitable techniques for obtaining an average of the values stored in a respective row of the memory structure exemplarily shown in FIG. 7. For example, the compensation sections may add all active power measures or reactive power measures of a row each time a new value is stored in that row, and then divide the resulting sum by the number of values stored in that row, e.g. N. As another example, the compensation sections may apply a running average method or a sliding window method.

The first and the second compensation sections 620, 630 may be adapted to adjust the group reference vector (Pref; Qref) based on the group average vector (Pavg; Qavg), or based on the group average vector (Pavg; Qavg) and the group reference vector (Pref; Qref). Then, a group reference vector element associated to a specific row/group, e.g. (Prefe; Qrefe) associated to group e, can be adjusted based on its associated group average vector element (Pavge; Qavge), or based on its associated group average vector element (Pavge; Qavge) and its own value (Prefe; Qrefe). This adjusting can e.g. be realized by implementing a calculation process according to Pref_grp$_{t+1}$=Pref_grp$_t$+k·PAvg_grp$_t$/(k+1), where Pref_grp$_{t+1}$ is the new reference value Pref of group grp (i.e. the group reference vector element related to group grp) at time t+1, Pref_grp$_t$ is the former reference value Pref of group grp at time t, PAvg_grp$_t$ is the group average of group grp (i.e. the group average vector element related to group grp) at time t, and k>0; k<1 for privileging the first term of the right hand side of the equation above; k>1 for privileging the second term of the right hand side of the equation above. PAvg_grp can either be updated before or after adjusting the group reference value. Naturally, the above example applies equivalently to adjusting Qref.

As mentioned above with reference to FIG. 5, the compensation sections 620; 630 may each have two outputs for outputting a first and a second threshold value, Pthr− and Pthr+; Qthr− and Qthr+, wherein the respective first threshold is smaller than the respective second threshold. Preferably, the compensation sections 620; 630 adjust any one of the thresholds, Pthr−, Pthr+; Qthr−, Qthr+, by evaluating the value distribution of the past obtained active and reactive power measures stored in the suitable memory structure, as exemplarily shown in FIG. 7, with respect to the group reference vector element which is associated with the AC supply voltage applying at the time the active/reactive power measure value is obtained. The first and second thresholds for a respective applied supply voltage range, i.e. with respect to a specific group reference vector element, can e.g. be adjusted based on the standard deviation of past active or reactive power measures, e.g. stored in the respective row of the memory structure exemplarily shown in FIG. 7.

Figure 6:
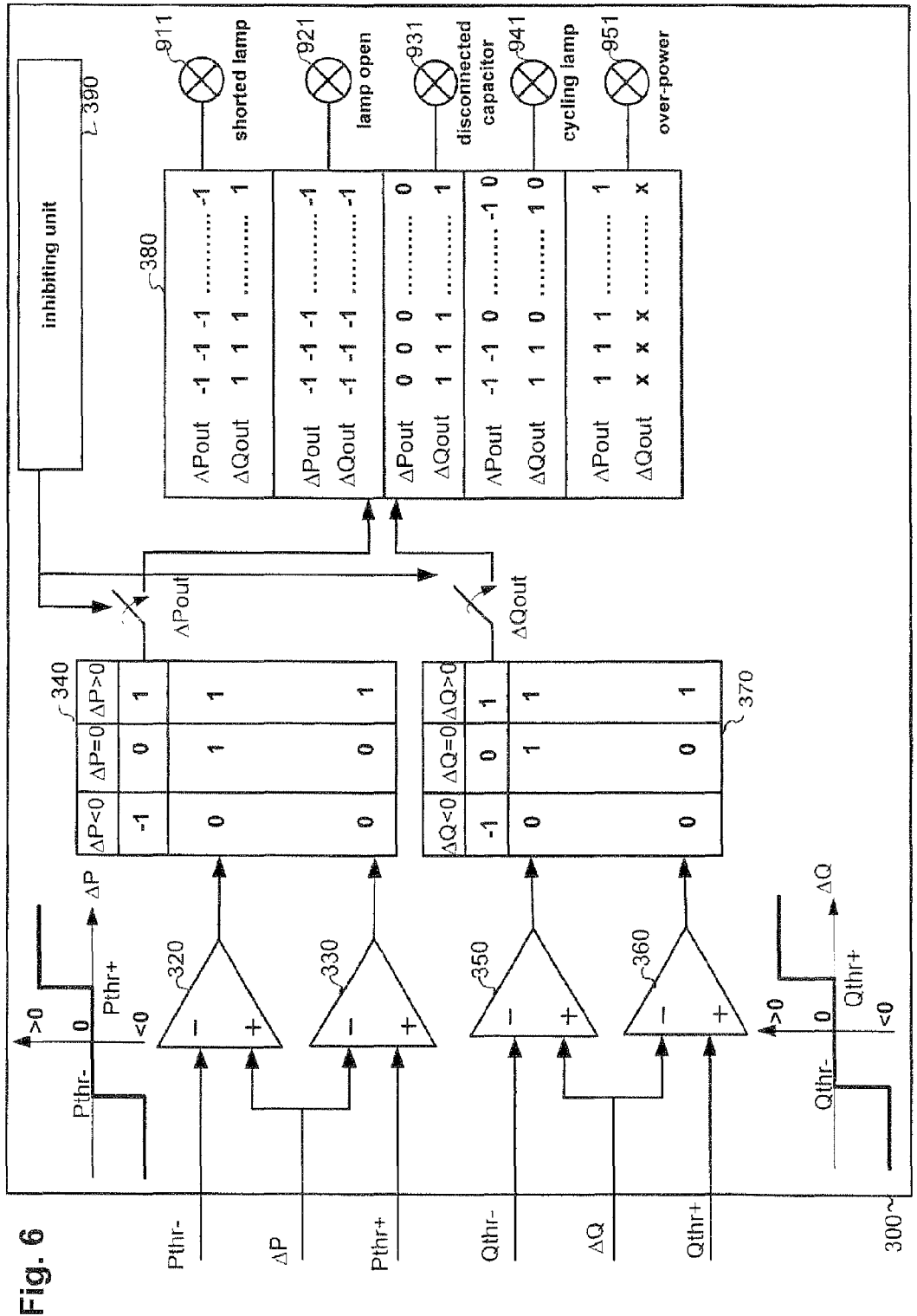
FIG. 6 shows a block diagram illustrating an embodiment of the fault detecting section.

In FIG. 6, the function of the first and second thresholds is illustrated. Each threshold value, Pthr−, Pthr+; Qthr, Qthr+, provided from the compensation sections 620; 630 shown in FIG. 6, is fed to a respective comparator 320, 330, 350, 360. The other input of the comparators 320, 330 is fed with the output of the comparison section 625. The other input of the comparators 350, 360 is fed with the output of the comparison section 635. The outputs of comparators 320, 330 are fed to a first detecting logic 340 for outputting a value indicative of the detected variation of the obtained active measure. The output value, ΔPout, of the first detecting logic 340 is of negative sign for a detected negative variation, is zero if no variation is detected, is of positive sign for a detected positive variation. The outputs of comparators 350, 360 are fed to a second detecting logic 370 for outputting a value indicative of the detected variation of the obtained reactive measure. The output value, ΔPout, of the second detecting logic 370 is of negative sign for a detected negative variation, is zero if no variation is detected, is of positive sign for a detected positive variation. The output values of the first and second detecting logics 340, 370 are fed via a respective switch, which is controlled by an inhibiting section 390, to a final detecting logic 380 which is adapted to detect the occurrence of a fault and its type. The final detecting logic 380 may store a plurality of past output values ΔPout, ΔQout of the first and second detecting logics. If several successive values of ΔPout are of negative sign and several successive values of ΔQout are of positive sign, then a shorted lamp fault is detected, and an alarm is initiated, e.g. by lighting lamp 911. If several successive values of ΔPout are of negative sign and several successive values of ΔQout are of negative sign, then a lamp open fault is detected, and an alarm is initiated, e.g. by lighting lamp 921. If several successive values of ΔPout are zero and several successive values of ΔQout are of positive sign, then a fault due to disconnected capacitor is detected, and an alarm is initiated, e.g. by lighting lamp 931. If several successive values of ΔPout are of negative sign and several successive values of ΔQout are of positive sign, interrupted by values of ΔPout, ΔQout of zero, then a cycling lamp fault is detected, and an alarm is initiated, e.g. by lighting lamp 941. If several successive values of ΔPout are of positive sign, irrespective of values of ΔQout, then an over-power fault is detected, and an alarm is initiated, e.g. by lighting lamp 951.

The inhibiting section 390 controls the respective switch so that a fault detection during a period of warming-up of the plurality of street lamps is inhibited. Moreover, the inhibiting section 390 initiates initialization of the group average vector with respective values of the group reference vector.

Figure 8:
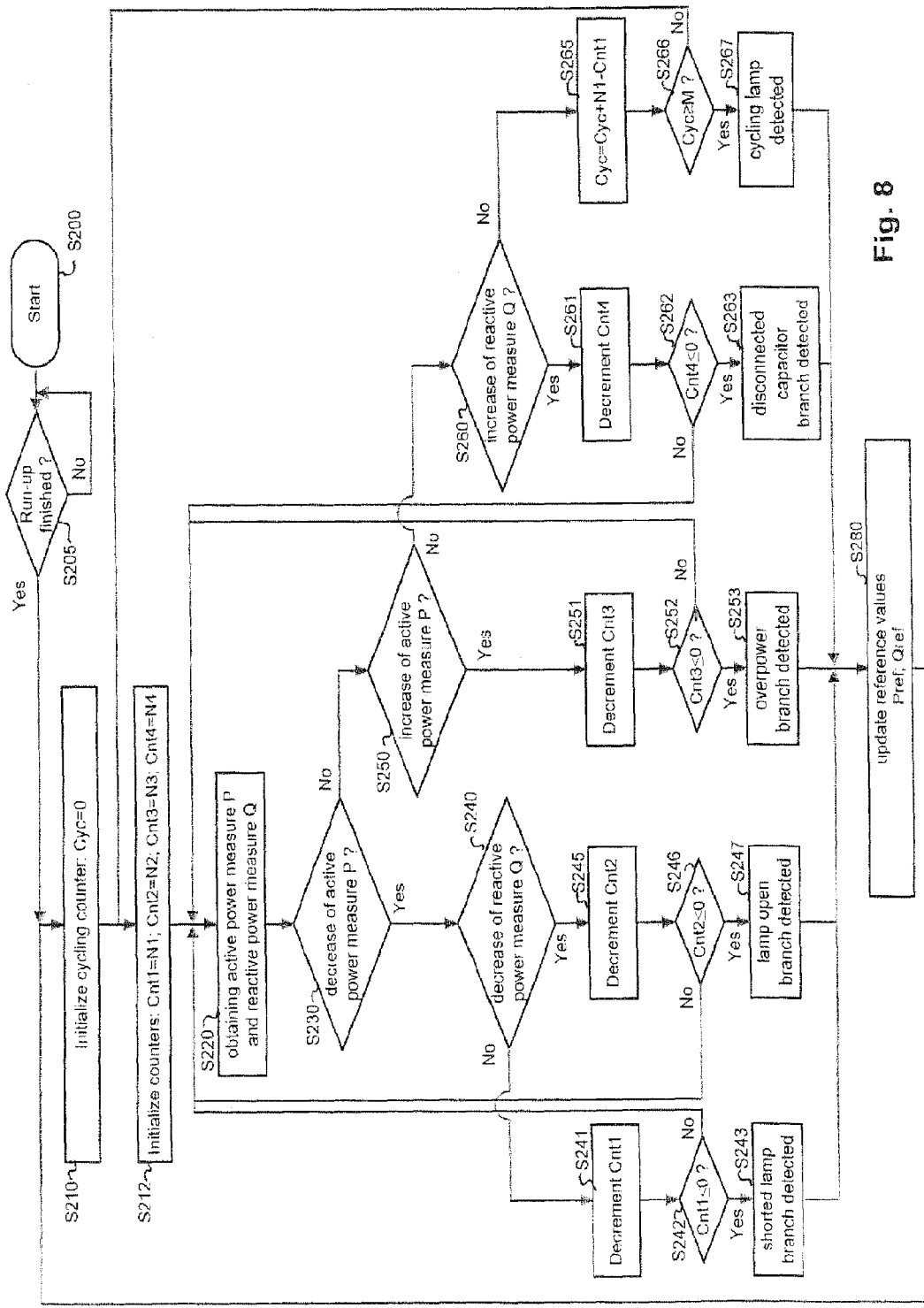
FIG. 8 shows a flow diagram illustrating an exemplary flow of processing performed by the fault detecting device.

FIG. 8 shows a flow diagram illustrating an exemplary flow of processing performed by the fault detecting device.

After starting, S200, the fault detecting device, it is checked, in step S205, whether the run-up, i.e. the period required for warming-up the street lamps, has been finished. After finished run-up, in step S210, a cycling counter Cyc is initialized to zero. Then, in step S212, fault confirmation counters Cnt1, Cnt2, Cnt3, Cnt4 are initialized to N1, N2, N3, and N4, respectively.

In the following step S220, an active power measure P and a reactive power measure Q is obtained. These measures may be corrected, e.g. be normalized by the ratio of the supplied voltage to the rated supply voltage, or based on a predefined normalizing function capable of taking into account non-linear behaviour of the plurality of street lamps.

Then, in step S230, it is determined whether a decrease of the active power measure has been detected. In case that it is determined in step S230 that a decrease has been detected, it is then determined in step S240, whether a decrease of the reactive power measure Q has been detected.

In case that it is determined that no decrease of the reactive power measure Q has been detected, counter Cnt1 is then decremented in step S241, and it is checked in step S242, whether counter Cnt1 is equal to or smaller than zero. Counter Cnt1 is used for preventing false signalling due to spurious measurements or due to cycling effects. If counter Cnt1 is equal to or smaller than zero, then a shorted lamp fault is detected in step S243, and the procedure proceeds to step S280. If in step S242 it is not determined that counter Cnt1 is equal to or smaller than zero, then the procedure proceeds to step S220.

In case that a decrease of the reactive power measure Q is determined in step S240, counter Cnt2 is then decremented in step S245, and it is checked in step S2426 whether counter Cnt2 is equal to or smaller than zero. If counter Cnt2 is equal to or smaller than zero, then a lamp open fault is detected in step S247, and the procedure proceeds to step S280. If in step S246 it is not determined that counter Cnt2 is equal to or smaller than zero, then the procedure proceeds to step S220.

If, in step S230, it is determined that a decrease has not been detected, it is then determined in step S250, whether an increase of the active power measure P has been detected.

In case that it is determined in step S250 that an increase of the active power measure P has been detected, counter Cnt3 is then decremented in step S251, and it is checked in step S252, whether counter Cnt3 is equal to or smaller than zero. If counter Cnt3 is equal to or smaller than zero, then an overpower fault is detected in step S253, and the procedure proceeds to step S280. If in step S252 it is determined that counter Cnt3 is not equal to or smaller than zero, then the procedure proceeds to step S220.

If, in step S250, it is determined that an increase has not been detected, it is then determined in step S260, whether an increase of the reactive power measure Q has been detected.

In case that an increase of the reactive power measure Q is determined in step S260, counter Cnt4 is then decremented in step S261, and it is checked in step S262, whether counter Cnt4 is equal to or smaller than zero. If counter Cnt4 is equal to or smaller than zero, then a fault due to a disconnected capacitor is detected in step S263, and the procedure proceeds to step S280. If in step S262 it is determined that counter Cnt4 is not equal to or smaller than zero, then the procedure proceeds to step S220.

In case that it is determined in step 260 that an increase of the reactive power measure Q has not been detected, counter Cyc is then incremented by the difference between the initial value N1 of counter Cnt1 and the present value of this counter Cnt1 in step S265, and it is checked in step S266, whether counter Cyc is not smaller than threshold M. If counter Cyc is not smaller than threshold M, then a cycling lamp fault is detected in step S267, and the procedure proceeds to step S280. If in step S266 it is determined that counter Cyc is smaller than threshold M, then the procedure proceeds to step S212.

In step S280, after a fault has been detected, the reference values Pref and Qref are updated.

Figure 9:
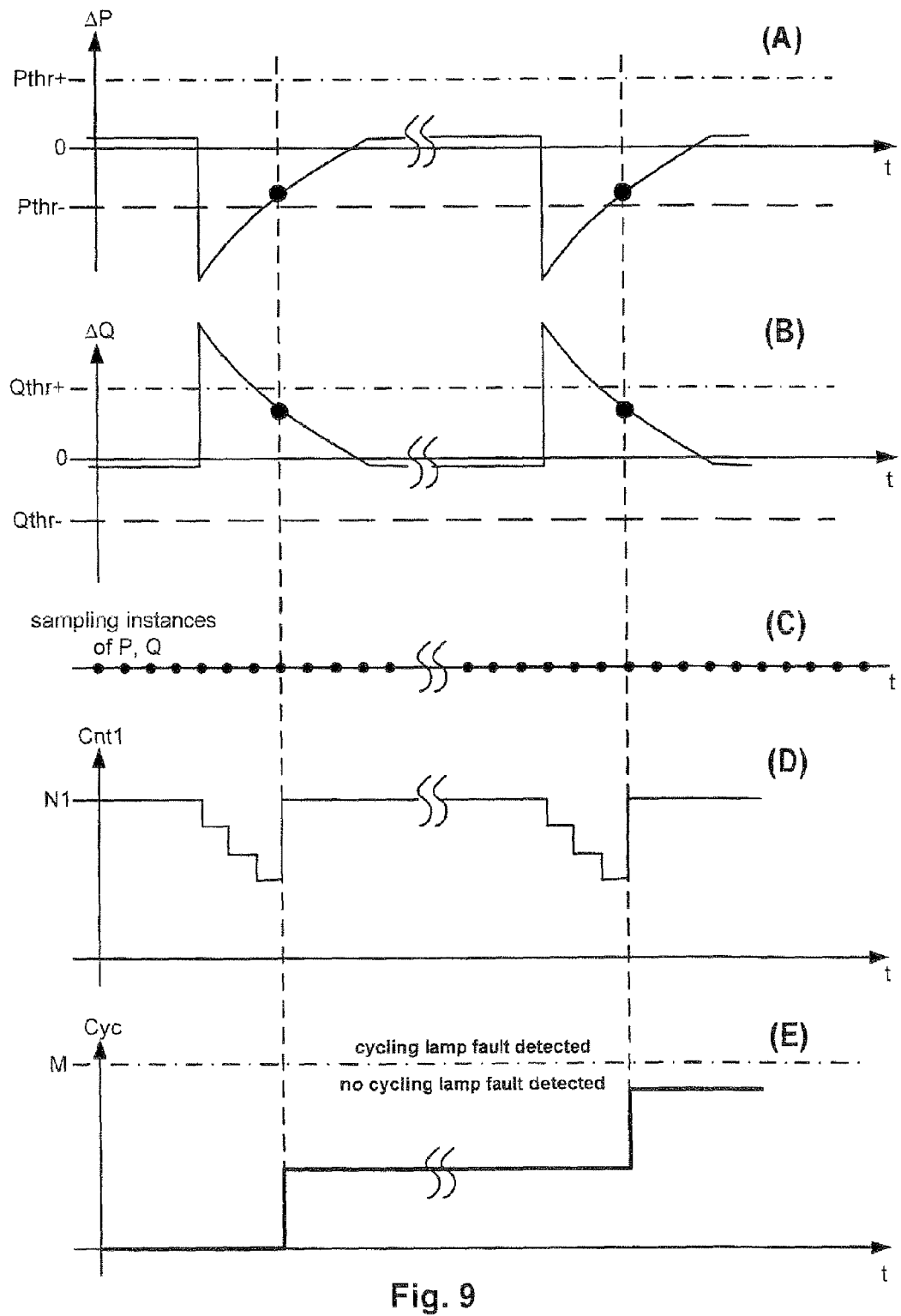
FIG. 9 shows variations of measures of active power and reactive power over time for a scenario of a cycling lamp (FIGS. 9 (A) and (B)), and also shows exemplary corresponding values of a fault confirmation counter (FIG. 9 (D)) and a cycling counter (FIG. 9 (E)) as a function of time and sampling instances of active and reactive power measures (FIG. 9 (C)).

FIG. 9 provides further illustrations regarding the case of a cycling lamp. In FIGS. 9 (A) and (B), the variations of measures of active power and reactive power over time are shown for this scenario. Exemplary corresponding values of fault confirmation counter N1 and cycling counter Cyc over time are shown in FIGS. 9 (D) and (E), respectively, and are also shown in relation to sampling instances for obtaining measures of active power and reactive power, as shown in FIG. 9 (C).

During regular operation, i.e. when the faulty lamp to be suffering from cycling still emits light, the variations of the active power measure and of the reactive power measure remain close to zero, so that no negative or positive variation of P and/or Q will be detected. At the time when the faulty lamp stops emitting light, the variation of the active power measure strongly decreases below threshold Pthr−, so that a negative variation of the active power measure will be detected (corresponding to "Yes" out of step S230 of FIG. 8), and the variation of the reactive power measure strongly increases above threshold Qthr+, so that a positive variation of the reactive power measure will be detected (corresponding to "No" out of step S240 of FIG. 8). Then, fault confirmation counter Cnt1 is decremented (corresponding to step S241 of FIG. 8). After that, as shown in FIG. 9, for subsequent sampling instances of P and Q, the magnitudes of the variations of the active and reactive power measures decrease slowly over time. Then, when the variation ΔP has become small enough, i.e. within the interval from Pthr− to Pthr+, and the variation ΔQ has become small enough, i.e. within the interval from Qthr− to Qthr+, no variation of the active and reactive power measures is detected (corresponding to "No"-decisions in steps S230, S250, and S260). Thus, in step S265, cycling counter Cyc is incremented based on the current value of fault confirmation counter Cnt1, as also shown in FIG. 9 (E). If the value of cycling counter Cyc is below threshold value M, then no cycling lamp fault is detected in step S266, and fault confirmation counter Cnt1 is reset to N1 in step S212, as also shown in FIG. 9 (D). If the faulty lamp shows repetitive behaviour of emitting and non-emitting light, this whole process may repeat several times, and cycling count Cyc increases in a staircase like manner. If the value of cycling counter Cyc reaches or exceeds threshold value M, then a cycling lamp fault will be detected. Cycling counter Cyc is reset to zero during each run-up of the fault detecting system.

In order to keep the explanations relating to the fault detecting device simple, all embodiments have been described for a single-phase arrangement of the plurality of street lamps and the AC power supply. In case of a poly-phase line system, one fault detecting device is preferably provided for each respective phase, or for all three phases in common.

The scope of the claims is not limited by the explained embodiments. The scope of the present invention is defined by the attached set of claims.

The invention claimed is:

1. A device for detecting a fault of at least one street lamp of a plurality of street lamps which are connectable in common to an AC power supply, comprising:
   a first section for obtaining an active power measure (P) representative of the total active power (Pt) supplied by the AC power supply to the plurality of street lamps; and
   a second section for obtaining a reactive power measure (Q) representative of the total reactive power (Qt) supplied by the AC power supply to the plurality of street lamps;
   a third section for detecting a variation (ΔP) in the obtained active power measure (P);
   a fourth section for detecting a variation (ΔQ) in the obtained reactive power measure (Q); and
   a fault determination section for determining whether a fault of at least one street lamp has occurred based on the detected variations (ΔP, ΔQ) in the obtained active power measure (P) and in the obtained reactive power measure (Q).

2. The device of claim 1, wherein the fault determination section is adapted to determine a shorted lamp fault if the obtained active power measure (P) has been detected to have decreased and the obtained reactive power measure (Q) has been detected to have increased.

3. The device of claim 1, wherein the fault determination section is adapted to determine a lamp open fault if the obtained active power measure (P) has been detected to have decreased and the obtained reactive power measure (Q) has been detected to have decreased.

4. The device of claim 1, wherein the fault determination section is adapted to determine a lamp fault due to a disconnected capacitor if the obtained reactive power measure (Q) has been detected to have increased and the obtained active power measure (P) has been detected to have no variation.

5. The device of claim 1, wherein the fault determination section is adapted to determine a lamp cycling fault if the obtained active power measure (P) has been detected to decrease and increase repetitively and the obtained reactive power measure (Q) has been detected to increase and decrease repetitively.

6. The device of claim 1, said first section for obtaining an active power measure comprising:

a generating section for generating active energy pulses (EPp) each representative of a specific active energy amount supplied to the plurality of street lamps.

7. The device of claim 6, said first section for obtaining an active power measure comprising:
a fifth section for determining a frequency of n generated active energy pulses, where n is the number of active energy pulses counted in a time interval, as the active power measure (P).

8. The device of claim 6, said first section for obtaining an active power measure comprising:
a fifth section for determining a time interval between successive generated active energy pulses as the active power measure.

9. The device of claim 6, wherein the generating section for generating active energy pulses and/or the generating section for generating reactive energy pulses are implemented by means of an energy metering integrated circuit.

10. The device of claim 1, said section (130) for obtaining a reactive power measure comprising:
a generating section for generating reactive energy pulses each representative of a specific reactive energy amount supplied to the plurality of street lamps.

11. The device of claim 10, said second section for obtaining a reactive power measure comprising:
a sixth section for determining a frequency of n generated reactive energy pulses, where n is the number of reactive energy pulses counted in a time interval, as the reactive power measure (Q).

12. The device according to claim 11, comprising a seventh section for inhibiting the detection of a lamp fault during a period required by the street lamps for warming up.

13. The device of claim 10, said second section for obtaining a reactive power measure comprising:
a sixth section for determining a time interval between successive reactive energy pulses as the reactive power measure (Q).

14. The device of claim 1, further comprising:
a voltage detecting section for detecting a measure representative of the supply voltage of the AC power supply; and
power measure adjusting section for adjusting the obtained active power measure value (P) and/or the obtained reactive power measure value (Q) based on the detected measure representative of the supply voltage of the AC power supply.

15. The device of claim 14, wherein the power measure adjusting section is adapted for normalizing the active power measure (P) and/or the reactive power measure (Q) based on a predefined normalizing function capable of taking into account non-linear behavior of the plurality of street lamps.

16. The device of claim 14, wherein the power measure adjusting section is adapted for normalizing the active power measure (P) and/or the reactive power measure (Q) by the square of a ratio of the detected measure representative of the supply voltage of the AC power supply and a rated supply voltage.

17. The device of claim 1, wherein said third section for detecting a variation ($\Delta P$) in the obtained active power measure (P) and/or said fourth section for detecting a variation ($\Delta Q$) in the obtained reactive power measure (Q) comprises:
a comparing section adapted for detecting said variation of the active/reactive power measure based on a deviation of said obtained value of said active/reactive power measure from an active/reactive power measure reference value.

18. The device of claim 17, wherein said third section for detecting a variation ($\Delta P$) in the obtained active power measure (P) and/or said fourth section for detecting a variation ($\Delta Q$) in the obtained reactive power measure (Q) further comprises:
a compensation section adapted for
obtaining an average over a plurality of values obtained in the past of said active/reactive power measure, and adapted for
adjusting the active/reactive power measure reference value based on the obtained average.

19. The device according to claim 18, wherein
said compensation section is further adapted to
group past active/reactive power measure values into at least two groups depending on the AC power supply voltage applying at the time the respective power measure value was obtained, and to
obtain a respective group average of past active/reactive power measure values for each of the groups, and to
obtain a respective group reference value of a plurality of active/reactive power measure reference values, depending on the AC power supply voltage applying at the time the respective power measure value was obtained, and to
adjust the obtained group reference value based on the group average of past active/reactive power measure values which is associated with the AC supply voltage applying at the time the active/reactive power measure value is obtained; and
wherein the comparing section is further adapted to detect said variation of the active/reactive power measure based on a deviation of an obtained active/reactive power measure value from that group reference which is associated with the AC supply voltage applying at the time the active/reactive power measure value is obtained.

20. The device according to claim 19, which is adapted to perform, during powering-up, the step of initializing the values of groups of past active/reactive power measure values and the values of their respective group averages, such that each respective group of past active/reactive power measure values and its respective group average obtains the value of a respective group reference value.

21. The device of claim 18, wherein
the compensation section is adapted for normalizing each of said plurality of past successive active/reactive power measure values by a value corresponding to the ratio of the detected AC power supply voltage and a rated supply voltage, and for obtaining said average based on the normalized past active/reactive power measure values.

22. The device according to claim 18, wherein said average is a running average.

23. The device according to claim 18, wherein the compensation section is further adapted for adjusting the active/reactive power measure reference value based on the obtained average and on the previous active/reactive power measure reference value.

24. The device of claim 18, wherein said third section for detecting a variation ($\Delta P$) in the obtained active power measure (P) and/or said fourth section for detecting a variation ($\Delta Q$) in the obtained reactive power measure (Q) further comprises:
a seventh section for inhibiting non-regular power measures, which is adapted such that any past active/reactive power measure for which the fault determining section determined that a fault occurred, is not represented in the obtained average.

25. The device according to claim 18, wherein the compensation device is adapted to maintain past values of obtained active/reactive power measure values and/or of at least one reference value during periods where the plurality of street lamps does not receive power from the AC power supply.

26. The device according to claim 18, comprising a unit for preventing said compensation section from updating the average during a period required by the street lamps for warming up and/or during periods when the plurality of street lamps does not receive power from the AC power supply.

27. The device according to claim 17, wherein said comparing section is adapted to detect said variation of the active/reactive power measure by comparing the deviation against a threshold.

28. The device according to claim 27, wherein said third or fourth section for detecting a variation in the obtained active/reactive power measure is adapted to adjust any one of the thresholds by either evaluating the value distribution of the active/reactive power measure values used for obtaining the average over a plurality of values obtained in the past of said active/reactive power measure with respect to the active/reactive power measure reference value, or by evaluating the value distribution of the group of past active/reactive power measure values, which is associated with the AC supply voltage applying at the time the active/reactive power measure value is obtained, with respect to that group reference which is associated with the AC supply voltage applying at the time the active/reactive power measure value is obtained.

29. The device according to claim 17, wherein said third or fourth section for detecting a variation in the obtained active/reactive power measure is adapted to compare said deviation against a first threshold and against a second threshold larger than the first threshold; and to detect negative variation if said deviation is below said first threshold, positive variation if said deviation is larger than the second threshold and no variation if the deviation is larger than the first and smaller than the second threshold.

30. The device according to claim 17, wherein the third section for detecting a variation in the obtained active power measure and/or the fourth section for detecting a variation in the obtained reactive power measure is adapted for adjusting the average, the reference or the first threshold and/or second threshold by multiplication with a measure corresponding to the ratio of the detected AC power supply voltage and a rated supply voltage.

31. A method for detecting a fault of at least one street lamp of a plurality of street lamps which are connected in common to an AC power supply, comprising the steps of:

supplying power from the AC power supply to the plurality of street lamps;

obtaining an active power measure (P) representative of the total active power supplied by the AC power supply to the plurality of street lamps;

obtaining a reactive power measure (Q) representative of the total reactive power supplied by the AC power supply to the plurality of street lamps;

detecting a variation ($\Delta P$) in the obtained active power measure (P);

detecting a variation ($\Delta Q$) in the obtained reactive power measure (Q); and determining whether a fault of at least one street lamp has occurred based on the detected variations ($\Delta P$, $\Delta Q$) in the obtained active power measure (P) and in the obtained reactive power measure (Q).

32. A computer program product, which when loaded into program memory of a processor or microcontroller, causes the processor or microcontroller to carry out a method according to claim 31 for detecting a fault of at least one street lamp of a plurality of street lamps which are connected in common to an AC power supply.

* * * * *